(12) United States Patent
Broughton

(10) Patent No.: US 10,107,322 B2
(45) Date of Patent: *Oct. 23, 2018

(54) BRACKET FOR SECURING A STRUCTURAL MEMBER

(71) Applicant: Roskear Porter Broughton, San Francisco, CA (US)

(72) Inventor: Roskear Porter Broughton, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,396

(22) Filed: Mar. 24, 2016

(65) Prior Publication Data

US 2016/0327079 A1    Nov. 10, 2016

Related U.S. Application Data

(63) Continuation of application No. 14/524,969, filed on Oct. 27, 2014, now Pat. No. 9,297,399, which is a
(Continued)

(51) Int. Cl.
| | |
|---|---|
| *F16B 12/10* | (2006.01) |
| *F16B 12/40* | (2006.01) |
| *F16B 12/44* | (2006.01) |
| *F16B 7/04* | (2006.01) |
| *F16B 7/18* | (2006.01) |

(Continued)

(52) U.S. Cl.
CPC ........... *F16B 12/10* (2013.01); *A47C 4/00* (2013.01); *B25G 3/36* (2013.01); *F16B 7/0413* (2013.01); *F16B 7/185* (2013.01); *F16B 12/40* (2013.01); *F16B 12/44* (2013.01);
(Continued)

(58) Field of Classification Search
CPC .......... F16B 12/40; F16B 12/44; F16B 12/14; F16B 2012/145; F16B 2012/103; F16B 12/18; F16B 12/30; F16B 2012/443; F16B 2012/446; F16B 12/46; F16B 2012/463; F16B 2012/466; F16B 12/48; F16B 7/185; F16B 7/0413; F16B 2012/106; A47C 4/00; B25G 3/36; Y10T 29/49947; Y10T 403/7075
See application file for complete search history.

(56) References Cited

U.S. PATENT DOCUMENTS 3,675,954 A * 7/1972 Konig ..................... E04B 1/617
52/471
3,989,397 A * 11/1976 Baker ..................... F16B 12/02
403/205
(Continued)

*Primary Examiner* — Christopher Garft
(74) *Attorney, Agent, or Firm* — Hanson Bridgett LLP; Russell Petersen

(57) ABSTRACT

A bracket for securing a structural member, which can be used in the assembly of modular furniture. The bracket includes a main bracket body and a first cantilever having a first length extending longitudinally from the main bracket body and a second cantilever having a second length that is shorter that the first length of the first cantilever, extending longitudinally from the main bracket body and substantially parallel to the first cantilever. The first cantilever is separated from the second cantilever to form a first channel for receiving a first structural member. In an alternative embodiment, a stabilizing member that is detached from the main bracket body may be substituted for the second cantilever to form the bracket.

13 Claims, 10 Drawing Sheets

Related U.S. Application Data continuation-in-part of application No. 13/506,534, filed on Apr. 24, 2012, now Pat. No. 9,456,693.

(51) Int. Cl.
*A47C 4/00* (2006.01)
*B25G 3/36* (2006.01)

(52) U.S. Cl.
CPC ... *F16B 2012/106* (2013.01); *Y10T 29/49947* (2015.01); *Y10T 403/7075* (2015.01)

(56) References Cited

U.S. PATENT DOCUMENTS

| | | | | |
|---|---|---|---|---|
| 4,049,002 A | * | 9/1977 | Kletschka | A61B 17/2812 604/27 |
| 4,435,935 A | * | 3/1984 | Larrea | E04B 1/617 52/461 |
| 7,802,408 B2 | * | 9/2010 | Asbury | F16B 5/02 403/21 |
| 2013/0234576 A1 | * | 9/2013 | Hixson | A47C 13/005 312/265.5 |

* cited by examiner

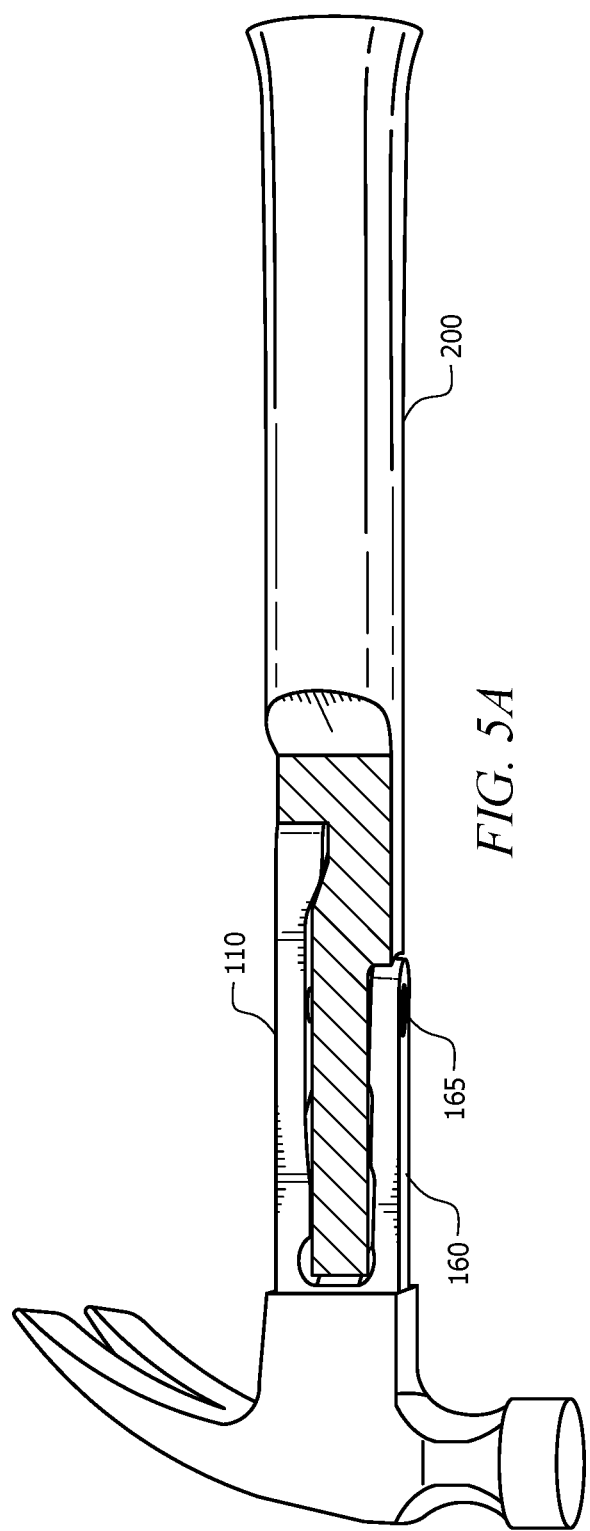

BRACKET FOR SECURING A STRUCTURAL MEMBER

TECHNICAL FIELD

The present application relates generally to a bracket for securing a structural member and more particularly to a bracket for securing a structural member for use in a modular furniture assembly.

BACKGROUND

Modular design of products attempts to combine the manufacturing advantages provided by standardization with the ability to customize the product. In modular design, the components of the product are manufactured separately and modular interfaces are used to assemble the components in various configurations, resulting in the desired product. For example, the modular design techniques employed in modular furniture allow the furniture to be sold and shipped in a compact, unassembled form and then assembled by the end-user. The ability to distribute the modular furniture in a more compact form reduces the distribution costs of the modular furniture. Additionally, the modularization of modular furniture allows a variety of component parts to be assembled into numerous design configurations.

While there are obvious benefits to the modular design of products, there also exist several disadvantages. A first disadvantage is the loss of structural strength that results from the use of the modular interface to connect the components together. In the case of modular furniture, it is known that the bracket used to connect the structural elements of the furniture introduces a weakness into the design. A second disadvantage is that many modular products are considered to be difficult to assemble and may require the end-user to read extensive directions, which is undesirable. A third disadvantage of modular products, and specifically modular furniture, is that modular furniture is equated with an inferior product. It is evident from the outward appearance of most modular furniture that the furniture is fabricated of components connected by interface modules, which is commonly considered inferior to custom crafted furniture.

Accordingly, there is a need in the art for an improved modular product that utilizes an interface module, such as a bracket, having an increased strength at the interface point. There also exists a need in the art for a modular product that reduces the difficulty in assembling the product. Additionally, there is a need in the art for a modular product having an improved perceived quality.

SUMMARY

A bracket for securing a structural member for use in a modular product is described.

In one embodiment, the bracket for securing a structural member includes, a main bracket body and a first cantilever having a first length extending longitudinally from the main bracket body and a second cantilever having a second length that is shorter that the first length of the first cantilever, extending longitudinally from the main bracket body and substantially parallel to the first cantilever. The first cantilever further includes a flange at a distal end of the first cantilever, a concave portion extending at least partially between the flange and the main bracket body and a fastener receiving void positioned within the concave portion of the first cantilever. The second cantilever further includes a flange at a distal end and a fastener receiving aperture within the flange of the second cantilever. The fastener receiving aperture of the second cantilever is substantially aligned with the fastener receiving void of the first cantilever and the first cantilever is separated from the second cantilever to form a first channel for receiving a first structural member.

In an additional embodiment, a method of securing a structural member to a main bracket body includes, inserting a structural member into a channel formed by a first cantilever and a second cantilever, the first cantilever having a first length extending longitudinally from the main bracket body and a second cantilever having a second length that is shorter that the first length of the first cantilever, extending longitudinally from the main bracket body and substantially parallel to the first cantilever. The first cantilever further includes a flange at a distal end of the first cantilever, a concave portion extending at least partially between the flange and the main bracket body and a fastener receiving void positioned within the concave portion of the first cantilever. The second cantilever further includes a flange at a distal end and a fastener receiving aperture within the flange of the second cantilever. The fastener receiving aperture of the second cantilever is substantially aligned with the fastener receiving void of the first cantilever and the first cantilever is separated from the second cantilever to form a first channel for receiving a first structural member. The method further includes, urging the structural member through the channel and towards the main bracket body until the flange of the first cantilever engages with a recessed portion formed within the structural member and the fastener receiving void of the first member is substantially aligned with the fastener receiving aperture of the second cantilever and with a through-hole formed within the structural member. After the structural has been urged into position, the method further includes, inserting a fastener through the fastener receiving aperture of the second cantilever, through the through-hole formed within the structural member and into the fastener receiving void of the first cantilever and tightening the fastener within the fastener receiving void of the first cantilever until the structural member is in contact with the main body of the bracket and the flange of the first cantilever is in contact with the recessed portion of the structural member.

In an additional embodiment, the second cantilever may be replaced by a stabilizing member that is detached from the main body of the bracket. In a particular embodiment, the stabilizing member may be in the form of a washer or spacer, as are commonly known in the art. The stabilizing member includes the fastener receiving aperture and the dimensions of the stabilizing member establish an aperture of sufficient depth for securely retaining a fastener within the fastener receiving aperture.

In an additional embodiment, wherein the second cantilever is replaced by a stabilizing member that is detached from the main bracket body, a method of securing a structural member to a main bracket body includes, positioning a structural member, having a through-hole, adjacent to a first cantilever, the first cantilever having a first length extending longitudinally from the main bracket body, the first cantilever comprising a flange at a distal end of the first cantilever, the first cantilever further comprising a concave portion extending at least partially between the flange and the main bracket body and a fastener receiving void positioned within the concave portion of the first cantilever. The method further includes, positioning a stabilizing member having a fastener receiving aperture adjacent to the structural member, wherein the fastener receiving aperture of the stabilizing member is substantially aligned with the fastener receiving void of the first cantilever and the through-hole of the structural member and the structural member is positioned between the first cantilever and the stabilizing member. After the structural member has been properly positioned, the method further includes, inserting a fastener through the fastener receiving aperture of the stabilizing member, through the through-hole formed within the structural member and through the fastener receiving void of the first cantilever and tightening the fastener until the structural member is in contact with the main body of the bracket and the flange of the first cantilever is in contact with the recessed portion of the structural member.

In accordance with the present invention an improved bracket for securing a structural member is provided.

BRIEF DESCRIPTION OF THE DRAWINGS

FIG. 5A is a diagrammatic view of a bracket having an integrated tool portion, and a partial cross-sectional view of the structural member securely positioned within the bracket, in accordance with an embodiment of the present invention.

DETAILED DESCRIPTION

Figure 1A:
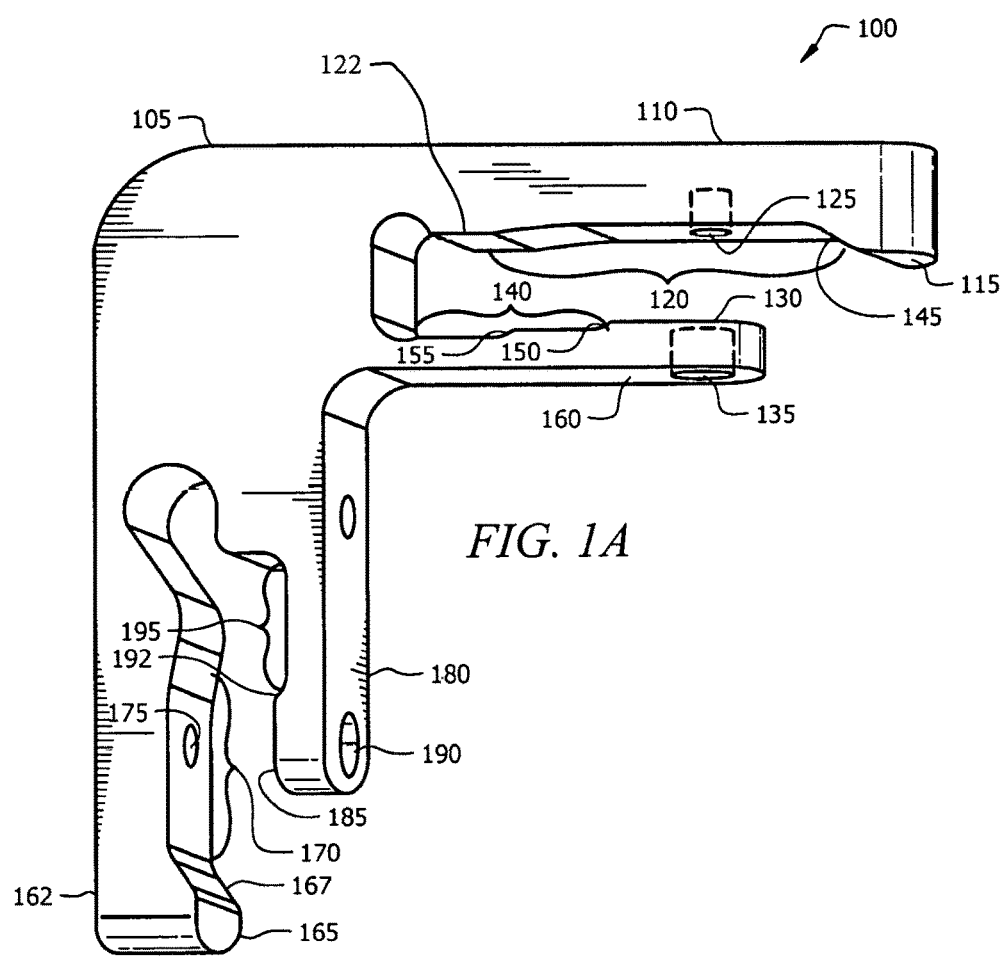
FIG. 1A is a diagrammatic view of a bracket for securing a structural member having a first cantilever and a second cantilever, in accordance with an embodiment of the present invention.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In the following description of the embodiments, substantially the same parts are denoted by the same reference numerals.

With reference to FIG. 1A, a bracket 100 for securing a first structural member in accordance with an embodiment of the present invention is illustrated. The bracket 100 includes a main bracket body 105, a first cantilever 110 having a first length extending longitudinally from the main bracket body 105. The first cantilever 110 having a flange 115 at a distal end of the first cantilever 110, a protrusion 122 adjacent a proximal end of the first cantilever, and a concave portion 120 extending at least partially between the flange 115 and the protrusion 122. The first cantilever 110 further comprising a fastener receiving void 125 positioned within the concave portion 120 of the first cantilever 110. The bracket 100 additionally includes, a second cantilever 160 having a second length that is shorter that the first length of the first cantilever 110, extending longitudinally from the main bracket body 110 and substantially parallel to the first cantilever 110. The second cantilever 160 having a flange 130 at a distal end and a fastener receiving aperture 135 within the flange of the second cantilever 160, the fastener receiving aperture 135 substantially aligned with the fastener receiving void 125 of the first cantilever 110. The second cantilever further comprising a concave portion 140 between the flange 130 of the second cantilever 160 and the main bracket body 105 and substantially aligned with the protrusion 122. The first cantilever 110 is separated from the second cantilever 160 to form a first channel for receiving a first structural member.

In one embodiment, the flange 115 of the first cantilever 110 may be fabricated having a sloped edge 145 adjacent to the concave portion 120 of the first cantilever 110 and the flange 130 of the second cantilever 160 may be fabricated having a first sloped edge 150 adjacent to the concave portion 140 of the second cantilever 160. In addition, the concave portion 140 of the second cantilever 160 may be sloped downward from the flange 130 toward the main bracket body 105. Alternatively, the concave portion 140 of the second cantilever 160 may be graduated downward from the flange 130, thereby comprising one or more progressively sloped edges 150, 155 adjacent to each other.

In an additional embodiment, the inside surface of the first cantilever 110 and the inside surface of the second cantilever 160 may be striated to provide for additional traction when inserting the first structural member into the channel between the first cantilever 110 and the second cantilever 160.

Referring again to FIG. 1A, the bracket may further include a third cantilever 162 and a fourth cantilever 180 working in combination to secure a second structural member. The third cantilever 162 having a third length extending longitudinally from the main bracket body 105, a flange 165 positioned at a distal end of the third cantilever 162 and a concave portion 170 extending at least partially between the flange 165 and the main bracket body 105. The third cantilever 162 further comprising a fastener receiving void 175 positioned within the concave portion 170 of the third cantilever 162. The bracket 100 additionally includes, a fourth cantilever 180 having a fourth length that is shorter that the third length of the third cantilever 162 and extending longitudinally from the main bracket 105 and substantially parallel to the third cantilever 162. The fourth cantilever 180 having a flange 185 at a distal end and a fastener receiving aperture 190 within the flange 185 of the fourth cantilever 180, the fastener receiving aperture 190 substantially aligned with the fastener receiving void 175 of the third cantilever 162. The fourth cantilever 180 further comprising a concave portion 195 between the flange 185 of the fourth cantilever 180 and the main bracket body 105. The third cantilever 162 is separated from the fourth cantilever 180 to form a second channel for receiving a second structural member.

In one embodiment, the flange 165 of the third cantilever 162 may be fabricated having a sloped edge 167 adjacent to the concave portion 170 of the third cantilever 162 and the flange 185 of the fourth cantilever 180 may be fabricated having a first sloped edge 192 adjacent to the concave portion 195 of the fourth cantilever 180. In addition, the concave portion 195 of the fourth cantilever 180 may be sloped downward from the flange 185 toward the main bracket body 105. Alternatively, the concave portion 195 of the fourth cantilever 180 may be graduated downward from the flange 185.

In an additional embodiment, the inside surface of the third cantilever 162 and the inside surface of the fourth cantilever 180 may be striated to provide for additional traction when inserting the second structural member into the channel between the third cantilever 162 and the fourth cantilever 180.

The bracket 100 may be substantially rigid and may be fabricated of metal or a metal alloy, wood or a wood product, plastic or any of a variety of other materials capable of begin fabricated to form the bracket 100. The second cantilever 160 may be substantially flexible to allow the first structural member to be securely clamped within the channel provided by the first cantilever 110 and the second cantilever 160 upon insertion and tightening of the fastener. In addition, the fourth cantilever 180 may be substantially flexible to allow the first structural member to be securely clamped within the channel provided by the third cantilever 162 and the fourth cantilever 180 upon insertion and tightening of the fastener. In addition to securely clamping the structural member between the cantilevers of the bracket, the tightening of the fastener also results in a crimping effect resulting from the alignment of the recessed and non-recessed portions of the cantilevers.

Utilizing the bracket 100 illustrated in FIG. 1A, a first structural member positioned between the first cantilever 110 and the second cantilever 160 can be substantially secured to a second structural member positioned between the third cantilever 162 and the fourth cantilever 180. While the embodiment in FIG. 1A illustrates the first channel formed by the first cantilever 110 and the second cantilever 160 and the second channel formed by the third cantilever 162 and the further cantilever 180 positioned at substantially a ninety degree angle relative to one another, it is also within the scope of the present invention that the first channel formed by the first cantilever 110 and the second cantilever 160 and the second channel formed by the third cantilever 162 and the further cantilever 180 be aligned along a longitudinal axis. In addition, any of a variety of other relative angles of the first channel and the second channel is considered within the scope of the present invention. For example, it is envisioned that the angle of the first channel relative to the second channel may be any of a variety of angles necessary to secure a first structural member to a second structural member is a desired configuration. Additionally, more than two channels formed by cantilevers and stabilizing members are considered within the scope of the present invention.

Figure 1B:
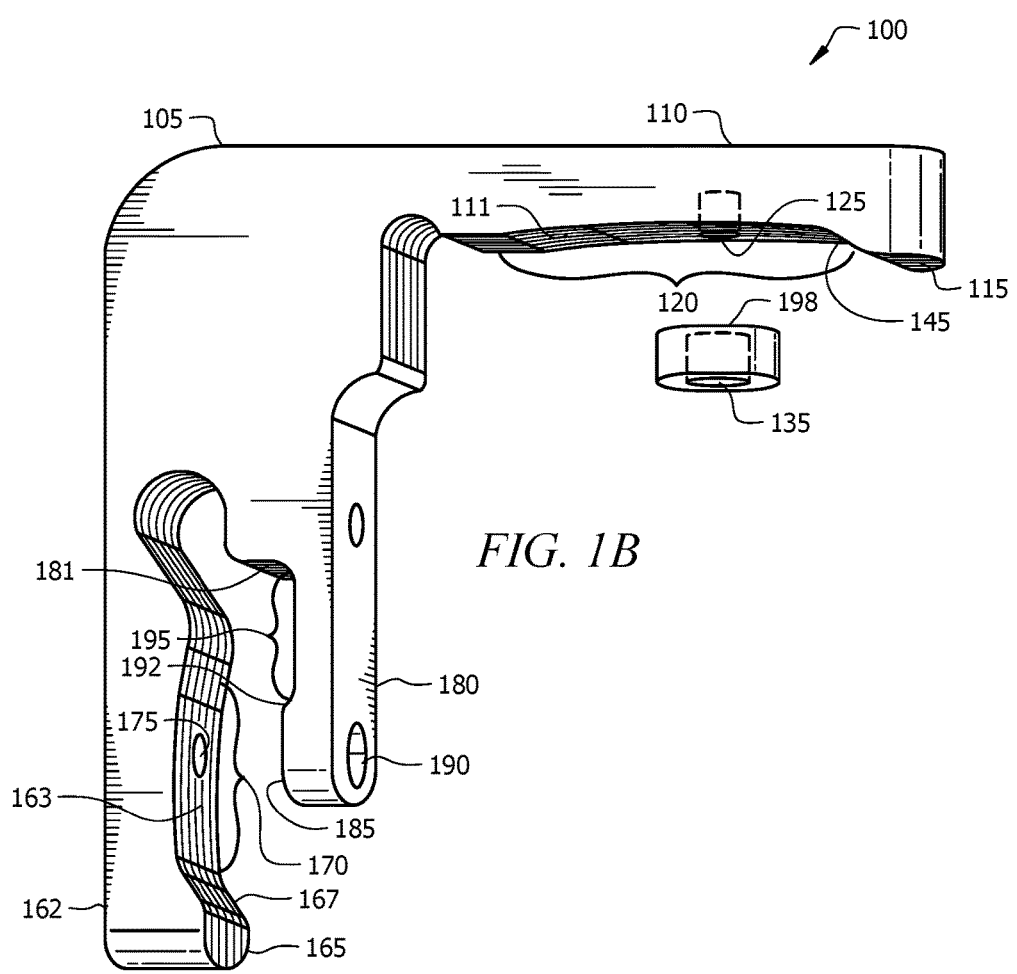
FIG. 1B is a diagrammatic view of a bracket for securing a structural member having a first cantilever and a stabilizing member, in accordance with an embodiment of the present

With reference to FIG. 1B, a bracket 100 for securing a first structural member in accordance with an embodiment of the present invention is illustrated. The bracket 100 includes a main bracket body 105, a first cantilever 110 having a first length extending longitudinally from the main bracket body 105. The first cantilever 110 having a flange 115 at a distal end of the first cantilever 110 and a concave portion 120 extending at least partially between the flange 115 and the main bracket body 105. The first cantilever 110 further comprising a fastener receiving void 125 positioned within the concave portion 120 of the first cantilever 110. The bracket 100 additionally includes a stabilizing member 198 that is detached from the main bracket body 110. The stabilizing member 198 includes a fastener receiving aperture 135 and the fastener receiving aperture 135 is substantially aligned with the fastener receiving void 125 of the first cantilever 110. The stabilizing member 198 is positioned such that the first cantilever 110 is separated from the stabilizing member 198 to form a first channel for receiving a first structural member.

In one embodiment, the flange 115 of the first cantilever 110 may be fabricated having a sloped edge 145 adjacent to the concave portion 120 of the first cantilever 110. The stabilizing member 198 may be in the form of a washer or spacer, as are commonly known in the art and the dimensions of the stabilizing member 198 provide a fastener receiving aperture 135 of sufficient depth for securely retaining a fastener within the fastener receiving aperture 135.

In an additional embodiment, the inside surface of the first cantilever 110 may be striated to provide for additional traction when inserting the first structural member into the channel between the first cantilever 110 and the stabilizing member 198.

Referring again to FIG. 1B, the bracket may further include a third cantilever 162 and a fourth cantilever 180 working in combination to secure a second structural member. The third cantilever 162 having a third length extending longitudinally from the main bracket body 105, a flange 165 positioned at a distal end of the third cantilever 162 and a concave portion 170 extending at least partially between the flange 165 and the main bracket body 105. The third cantilever 162 further comprising a fastener receiving void 175 positioned within the concave portion 170 of the third cantilever 162. The bracket 100 additionally includes, a fourth cantilever 180 having a fourth length that is shorter that the third length of the third cantilever 162 and extending longitudinally from the main bracket 105 and substantially parallel to the third cantilever 162. The fourth cantilever 180 having a flange 185 at a distal end and a fastener receiving aperture 190 within the flange 185 of the fourth cantilever 180, the fastener receiving aperture 190 substantially aligned with the fastener receiving void 175 of the third cantilever 162. The fourth cantilever 180 further comprising a concave portion 195 between the flange 185 of the fourth cantilever 180 and the main bracket body 105. The third cantilever 162 is separated from the fourth cantilever 180 to form a second channel for receiving a second structural member.

In one embodiment, the flange 165 of the third cantilever 162 may be fabricated having a sloped edge 167 adjacent to the concave portion 170 of the third cantilever 162 and the flange 185 of the fourth cantilever 180 may be fabricated having a first sloped edge 192 adjacent to the concave portion 195 of the fourth cantilever 180. In addition, the concave portion 195 of the fourth cantilever 180 may be sloped downward from the flange 185 toward the main bracket body 105. Alternatively, the concave portion 195 of the fourth cantilever 180 may be graduated downward from the flange 185.

In an additional embodiment, the inside surface of the third cantilever 162 and the inside surface of the fourth cantilever 180 may be striated to provide for additional traction when inserting the second structural member into the channel between the third cantilever 162 and the fourth cantilever 180.

The bracket 100 may be substantially rigid and may be fabricated of metal or a metal alloy, wood or a wood product, plastic or any of a variety of other materials capable of begin fabricated to form the bracket 100. The second cantilever 160 may be substantially flexible to allow the first structural member to be securely clamped within the channel provided by the first cantilever 110 and the second cantilever 160 upon insertion and tightening of the fastener. In addition, the fourth cantilever 180 may be substantially flexible to allow the first structural member to be securely clamped within the channel provided by the third cantilever 162 and the fourth cantilever 180 upon insertion and tightening of the fastener. In addition to securely clamping the structural member between the cantilevers of the bracket, the tightening of the fastener also results in a crimping effect resulting from the alignment of the recessed and non-recessed portions of the cantilevers.

Utilizing the bracket 100 illustrated in FIG. 1B, a first structural member positioned between the first cantilever 110 and the stabilizing member 198 can be substantially secured to a second structural member positioned between the third cantilever 162 and the fourth cantilever 180. While the embodiment in FIG. 1B illustrates the first channel formed by the first cantilever 110 and the stabilizing member 198 and the second channel formed by the third cantilever 162 and the further cantilever 180 positioned at substantially a ninety degree angle relative to one another, it is also within the scope of the present invention that the first channel formed by the first cantilever 110 and the second cantilever 160 and the second channel formed by the third cantilever 162 and the further cantilever 180 be aligned along a longitudinal axis. In addition, any of a variety of other relative angles of the first channel and the second channel is considered within the scope of the present invention. For example, it is envisioned that the angle of the first channel relative to the second channel may be any of a variety of angels necessary to secure a first structural member to a second structural member is a desired configuration. Additionally, more than two channels formed by cantilevers and stabilizing members are considered within the scope of the present invention.

With reference again to the embodiment of the bracket illustrated in FIG. 1A, the cooperation between the first cantilever 110 and the second cantilever 160 provides for the insertion of a first structural member into the first channel established by the spacing between the first cantilever 110 and the second cantilever 160, as described in more detail below with reference to FIG. 2A-2D. Once the first structural member has been positioned within the channel, the first structural member may be secured in place by inserting a fastener through the fastener receiving aperture 135 of the second cantilever 160 and into the fastener receiving void 125 of the first cantilever 110. The fastener may be any of a variety of fasteners known in the art, including, but not limited to threaded fasteners. If the fastener is a threaded fastener, the fastener receiving void 125 may provide complimentary threading to that of the threaded fastener to allow secure engagement of the fastener within the fastener receiving void 125. Additionally, the fastener receiving aperture 135 of the second cantilever 160 may be fabricated to have a counter-sink feature that allows the fastener to be recessed within the fastener receiving aperture 135 and thereby being substantially flush with the second cantilever 160.

The first cantilever 110 and the second cantilever 160, in combination with the fastener, are effective in preventing the lateral flexion of the first structural member relative to the main bracket body 105. By preventing the lateral flexion of the first structural member within the bracket 100, the stabilization and overall strength of the combination of the bracket 100 and the structural member is increased.

In addition, the offset created as a result of the second cantilever 160 having a length that is shorter than the length of the first cantilever 110 improves the shear strength of the fastener when the structural member is positioned within the bracket 100 and the fastener is inserted through the fastener receiving void 135 in the second cantilever 160 and engaged with the fastener receiving void 125 of the first cantilever 110. When the first structural member is secured with the fastener between the first cantilever 110 and the second cantilever 160 and a force is applied at a distal end of the first structural member, in a direction normal to the first structural member, the pressure resulting from the applied force is redirected from the location of the fastener and refocused at the flange 115 of the first cantilever 110, thereby relieving the stress at the location of the fastener and improving the overall shear strength of the combination.

In order to aid in the insertion of the substantially rigid first structural member into the channel established by the first cantilever 110 and the second cantilever 160, the flange 115 of the first cantilever 110 may be fabricated having a sloped edge 145 adjacent to the concave portion 120 of the first cantilever 110 and the flange 130 of the second cantilever 160 may be fabricated having a sloped edge 150 adjacent to the concave portion 140 of the second cantilever.

FIGS. 2A-2D provide successive views illustrating how a structural member 200 is inserted into and secured within the bracket 100. The bracket 100 and a partial cross-sectional view of the first structural member 100 are illustrated in FIGS. 2A-2D. The elements of the bracket have been previously described with reference to FIG. 1A. The structural member 200 includes a first cutaway portion 207 on a first side of the structural member 200, the first cutaway portion 207 including a recessed portion 205 and a sloped portion 210 that are complimentary to the flange 115 and sloped edge 145 of the first cantilever 110, respectively. The structural member 200 additionally includes a second cutaway portion 215 on a second side of the structural member 200, the second cutaway portion 215 including a through-hole 220 extending between the first cutaway portion 207 and the second cutaway portion 215 of the structural member 200. In a specific embodiment, the structural member 200 is substantially rigid and may be fabricated of wood or a wood product, metal or a metal alloy, plastic, or any of a variety of other materials known in the art to provide a structural member possessing sufficient structural strength.

Figure 2A:
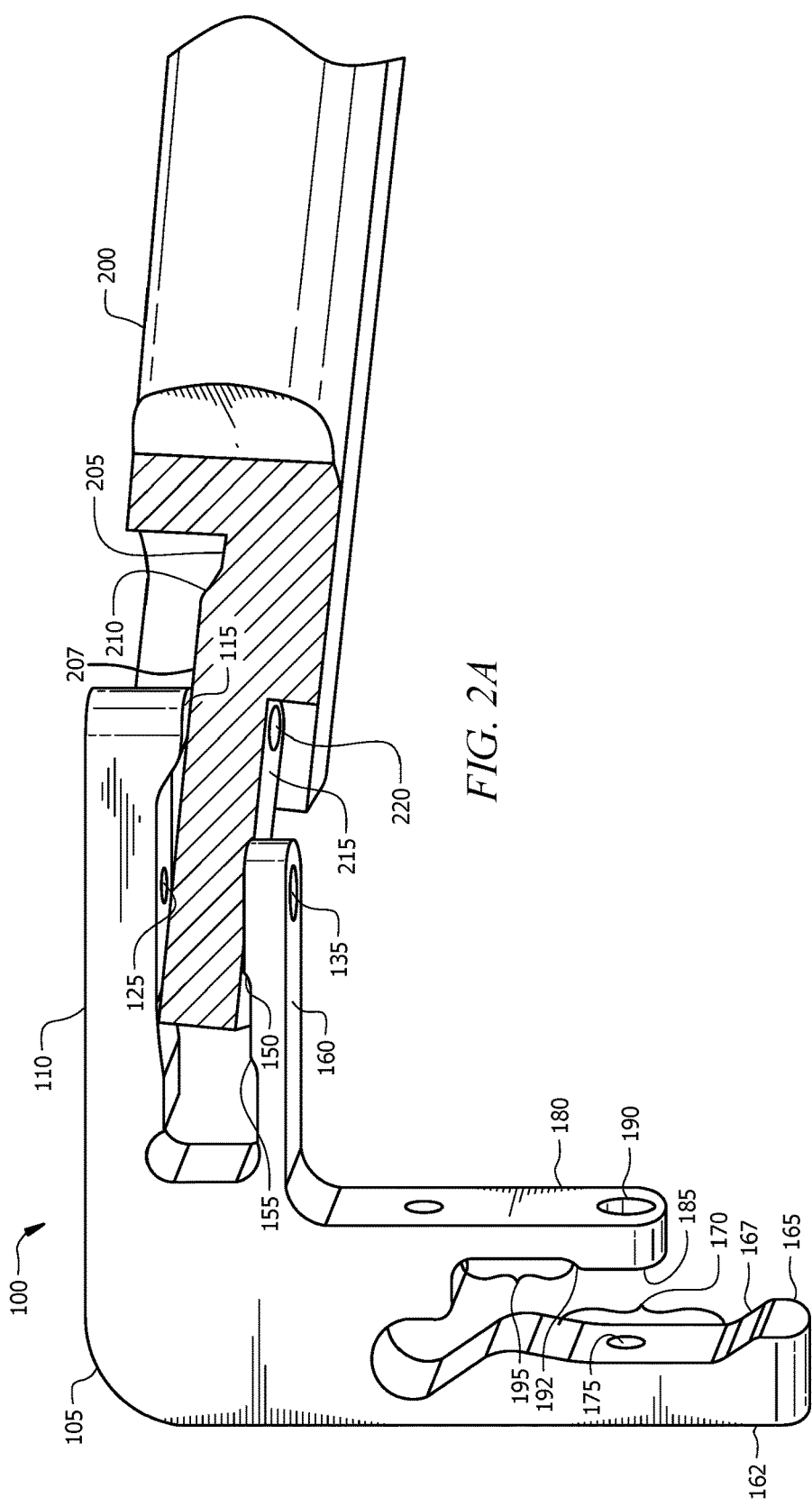
FIG. 2A is a diagrammatic view of a bracket for securing a structural member and a partial cross-sectional view of the structural member initially being introduced into the bracket, in accordance with an embodiment of the present invention.

With reference to FIG. 2A, in operation, a first end of the structural member 200 is inserted into the first channel established between the first cantilever 110 and the second cantilever 160 of the bracket 100. As shown the first cutaway portion 207 and the second cutaway portion 215 of the structural member 200 establish a portion of the structural member 200 dimensioned to fit in the channel between the first cantilever 110 and the second cantilever 160. As shown, upon initial insertion of the structural member 200, the first cutaway portion 207 is in contact with the flange 115 of the first cantilever 110 and the second cutaway portion 215 is in contact with the flange 130 of the second cantilever 160.

Figure 2B:
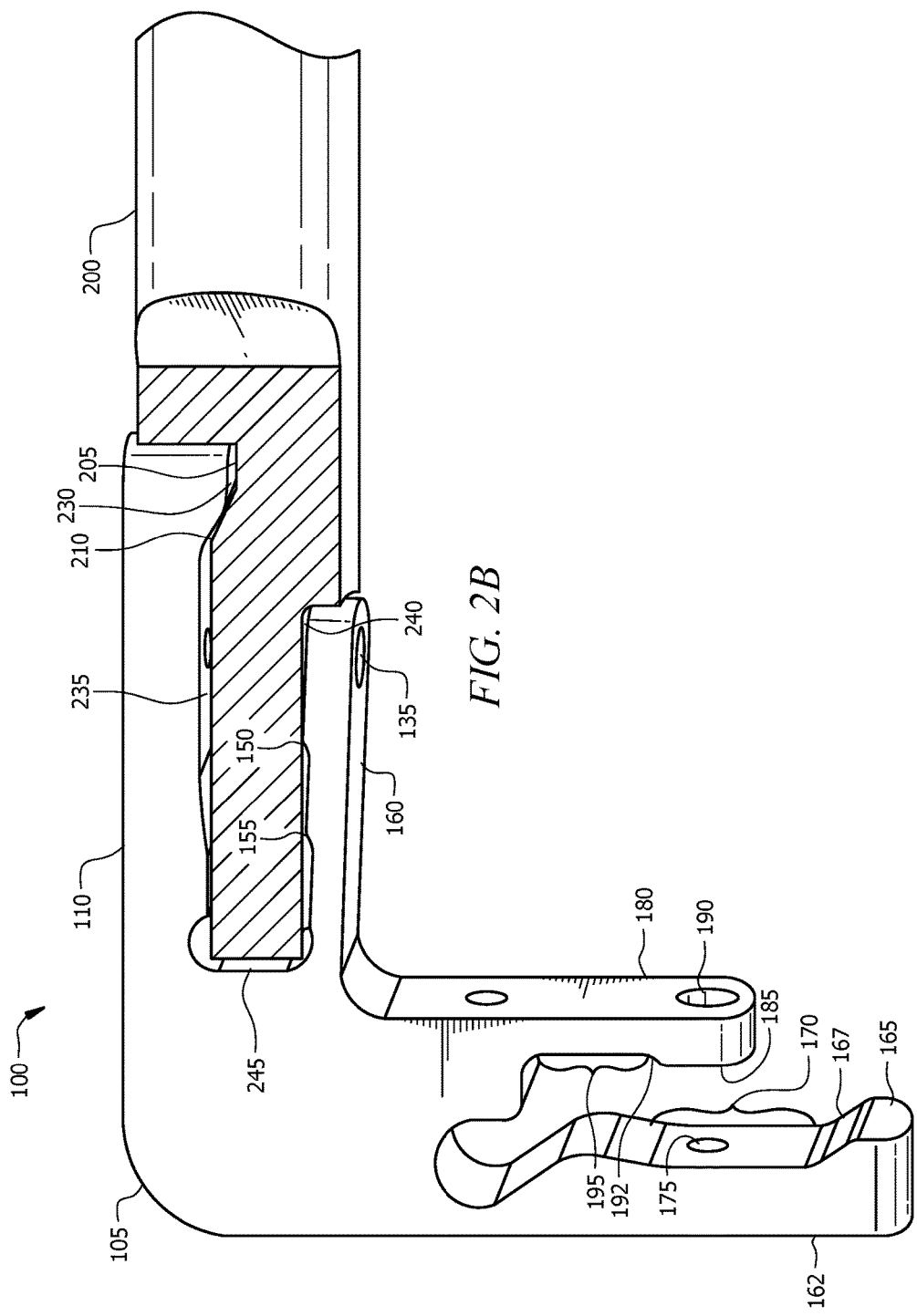
FIG. 2B is a diagrammatic view of a bracket for securing a structural member and a partial cross-sectional view of the structural member positioned with bracket, in accordance with an embodiment of the present invention.

With reference to FIG. 2B, after the first end of structural member 200 has been inserted into the first channel established between the first cantilever 110 and the second cantilever 160 of the bracket 100, a force is applied to the structural member 200 to urge the structural member 200 along the length of the channel and towards the main bracket body 105 of the bracket 100. The sloped edge 145 of the first cantilever 110 aids in the insertion of the structural member 200 by drawing the structural member 200 into the bracket 100 by aligning the slope 210 of the structural member 200 with the sloped edge 145 of the first cantilever 110, as the fastener is tightened. Since the structural member 200 and the first cantilever 110 are substantially rigid, urging the sloped portion 210 of the structural member 200 past the sloped edge 145 of the first cantilever 110 causing the structural member 200 to snap into position within the bracket 100, wherein the flange 115 of the first cantilever 110 is positioned within the recessed portion 205 of the structural member 200. The physical, and possibly audible, sensation of the structural member 200 snapping into position within the bracket 100 is a desirable feature of the invention which signifies to the user that the structural member 200 has been properly engaged within the bracket 100. With the structural member 200 properly positioned within the bracket 100, the fastener receiving void 125 of the first cantilever 110 and the fastener receiving aperture 135 of the second cantilever 160 are substantially aligned with the through-hole 220 of the structural member 200.

Figure 2C:
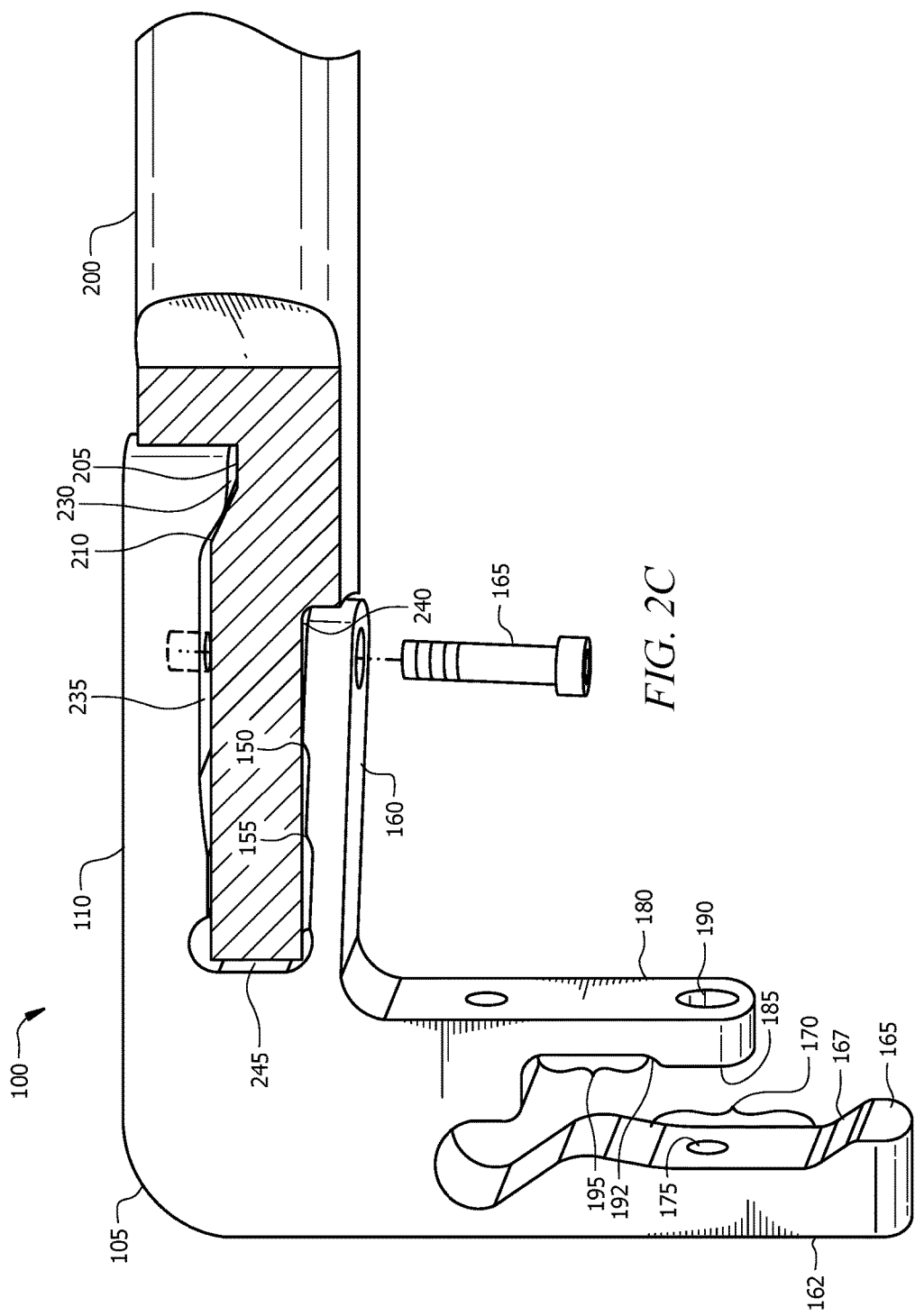
FIG. 2C is a diagrammatic view of a bracket for securing a structural member and a partial cross-sectional view of the structural member positioned with bracket and a fastener, in accordance with an embodiment of the present invention.

With reference to FIG. 2C, with the structural member 200 inserted between the first cantilever 110 and the second cantilever 160 of the bracket 100, a fastener may be inserted through the fastener receiving aperture 135 of the second cantilever 160, through the through-hole 220 of the structural member 200 and then through the fastener receiving void 125 of the first cantilever 110 to secure the structural member 200 within the bracket 100. As shown in FIG. 2B and 2C, prior to inserting the faster 165 through the through-hole 220 of structural member 200 and engaging the fastener 165 with the first cantilever 110 of the bracket 100, gaps or spaces remain between the structural member 200 and the bracket 100. In particular, a first gap 245 remains between the structural member 200 and the main body 105 of the bracket 100. A second gap 235 remains between the first cutaway portion 207 of the structural member 200 and the concave portion 120 of the first cantilever 110. A third gap 230 remains between the flange 115 of the first cantilever 110 and the recessed portion 205 of the structural member 200. A fourth gap 240 remains between the flange 130 of the second cantilever 160 and the second cutaway portion 215 of the structural member. Alternatively, the fastener 165 may be inserted in the reverse direction, wherein the fastener 165 is first inserted through the fastener receiving void 125 of the first cantilever 110, through the through-hole 220 of the structural member 200 and then through the fastener receiving aperture 135 of the first cantilever 160 to secure the structural member 200 within the bracket 100.

Figure 2D:
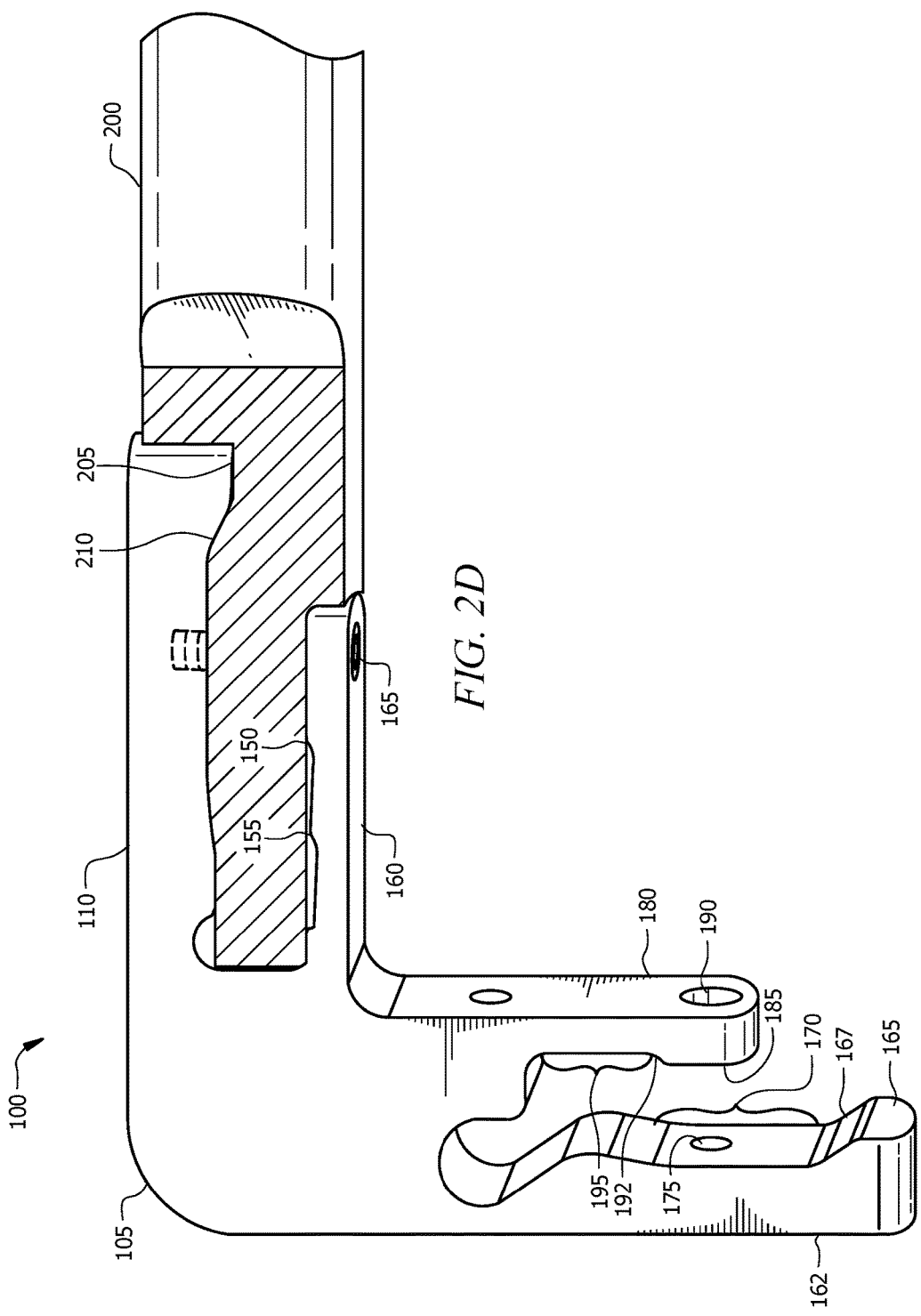
FIG. 2D is a diagrammatic view of a bracket for securing a structural member, a partial cross-sectional view of the structural member positioned with bracket, and a faster engaged with the bracket, in accordance with an embodiment of the present invention.

With reference to FIG. 2D, regardless of direction in which the fastener 165 is inserted, by tightening the fastener 165 that has been inserted through the fastener receiving aperture 135 of the second cantilever 160, through the through-hole 220 of the structural member 200 and through the fastener receiving void 125 of the first cantilever 110, the remaining gaps 230, 235, 240, 245 described with reference to FIG. 2C can be substantially eliminated or reduced. As the fastener 165 is tightened, the interaction between the sloped edge 145 of the first cantilever 110 and the complimentary sloped portion 210 of the structural member 200 cause the structural member 200 to be drawn closer towards the main bracket body 105 of the bracket 100, until the structural member 200 is in contact with the main bracket body 105, thereby substantially eliminating the gap 230 between the flange 115 of the first cantilever 110 and the recessed portion 205 of the structural member 200. As illustrated, while the gap 235 between the first cutaway portion 207 of the structural member 200 and the concave portion 120 of the first cantilever 110 is not eliminated by the tightening of the fastener 165, the gap 235 is substantially reduced. In addition, the gap 245 that remained between the structural member 200 and the main body 105 of the bracket 100 is substantially eliminated by tightening the fastener 165. In addition, since the second cantilever 160 is substantially flexible, tightening the fastener 165 results in a clamping effect between the first cantilever 110 and the second cantilever 160, wherein the flange 130 of the second cantilever 160 is drawn closer to the first cantilever 110 and the structural member 200, effectively clamping the structural member 200 between the first cantilever 110 and the second cantilever 160 and substantially removing the gap 240 between the flange 130 of the second cantilever 160 and the structural member 200.

Figure 3:
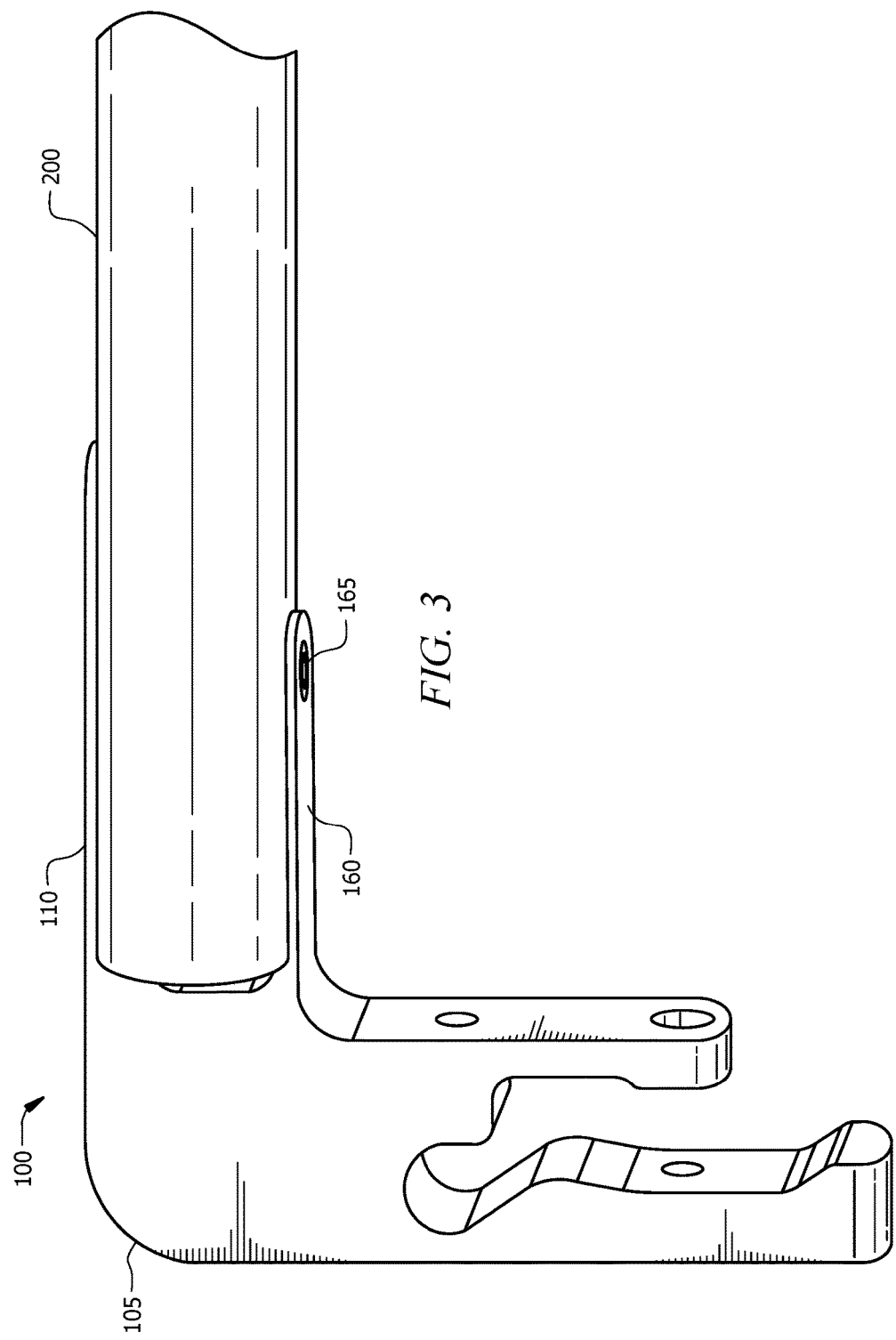
FIG. 3 is a diagrammatic view of a bracket for securing a structural member and the structural member securely positioned within the bracket, in accordance with an embodiment of the present invention.

With reference to FIG. 3, a full view of the structural member 200 is shown secured within the bracket 100. In this embodiment, the first cantilever 110 and the second cantilever 160 are positioned at a substantially ninety degree angle to the third cantilever 162 and the fourth cantilever 180, thereby allowing for the securing of a first structural member to a second structural member at substantially a ninety degree angle. As previously illustrated and described with reference to FIG. 2A-2D, the interior portion of the structural member 200 is fabricated with complimentary cutaway portions and recessed portions that allow the structural member 200 is securely engage with the bracket 100, thereby improving the overall strength of the combination.

Figure 4:
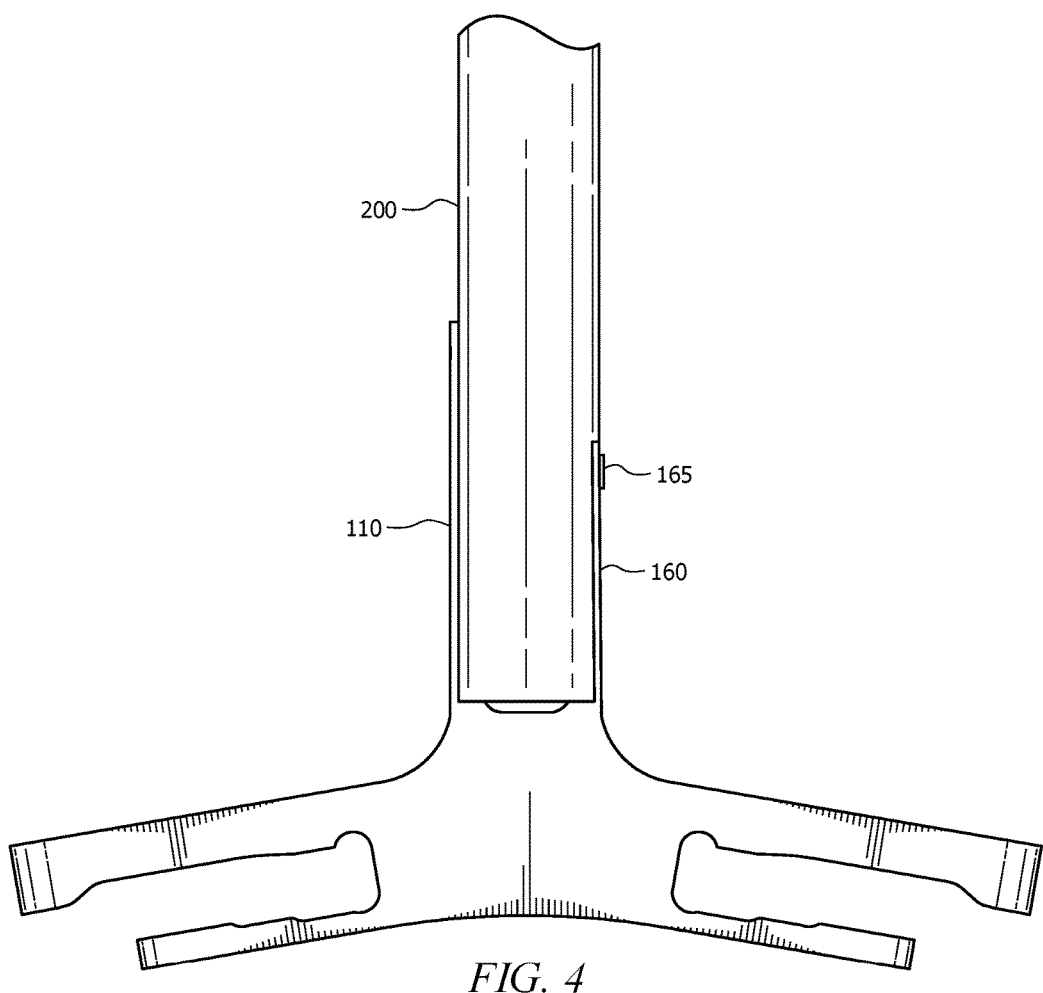
FIG. 4 is a diagrammatic view of an alternative bracket for securing a structural member and the structural member securely positioned within the bracket, in accordance with an embodiment of the present invention.

In an additional embodiment, with reference to FIG. 4, a full view of the structural member 200 is shown secured within the bracket 100. In this embodiment, the first cantilever 110 and the second cantilever 160 are positioned at a substantially ninety degree angle to the third cantilever and the fourth cantilever and an additional set of cantilevers are provided that are along substantially along the same axis as the third cantilever and the further cantilever. In this embodiment, a first structural member 200 is secured in the bracket 100 and the bracket 100 additionally allows for two additional structural members to be secured in the bracket 100, both at substantially a ninety degree angle with the first structural member and substantially aligned along the same axis.

The embodiments of the bracket 100 illustrated with reference to FIG. 3 and FIG. 4 are useful in the construction of various modular products. As shown with reference to FIG. 5A, the bracket 100 may include an integrated tool, such as a hammer head, fabricated on the main body 105 of the bracket 100. A structural member 200, such as a hammer handle, may then be secured to the bracket 100 and subsequently to the hammer head, thereby forming a modular hammer product. This embodiment is exemplary in nature, and various other modular products employing the bracket of the present invention and a structural member are within the scope of the present invention.

Figure 5B:
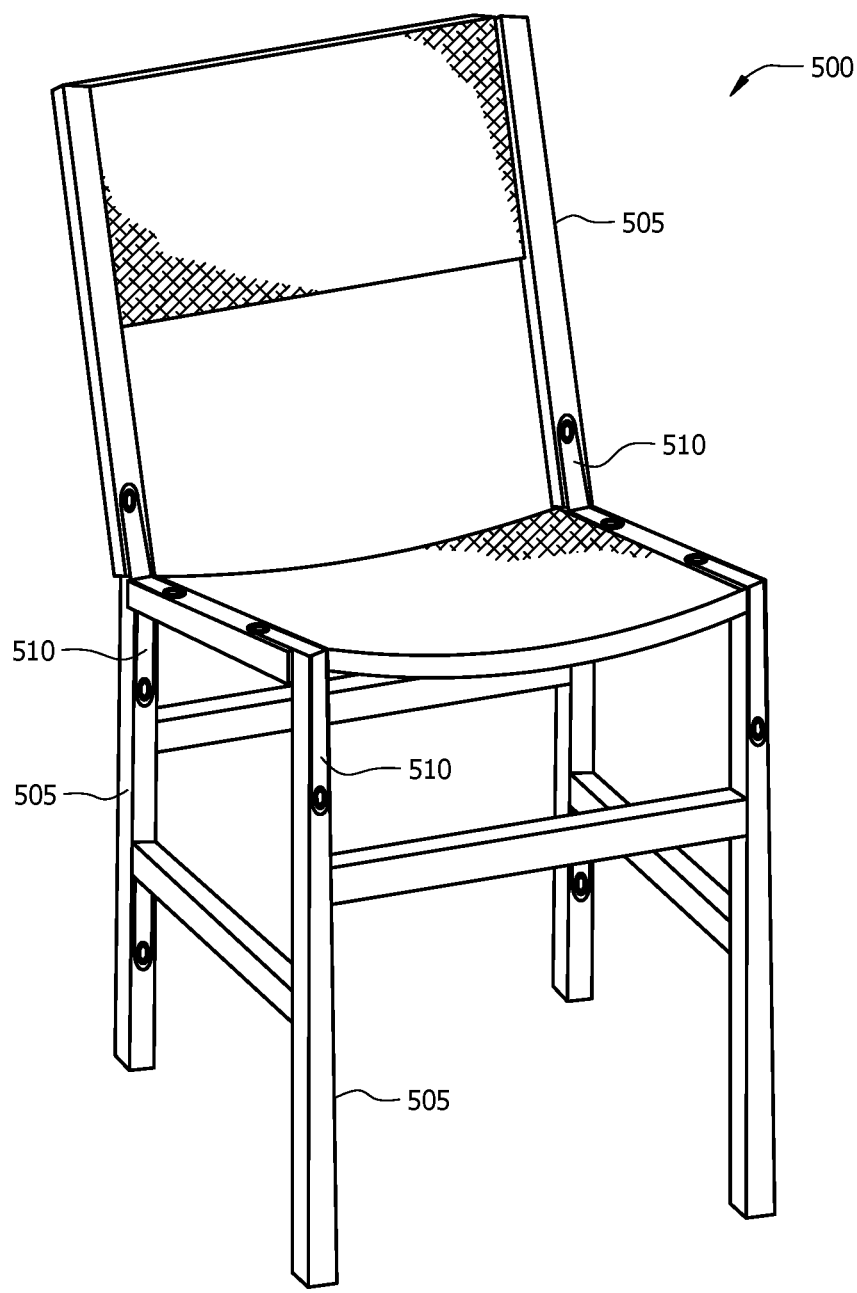
FIG. 5B is a diagrammatic view of a bracket incorporated within a modular furniture product comprising a plurality of structural members securely positioned within the bracket, in accordance with an embodiment of the present invention.

In an additional example, the embodiments of the bracket 100 illustrated with reference to FIG. 3 and FIG. 4 are useful in the construction of modular furniture, as shown with reference to FIG. 5B. As shown in FIG. 5B, a modular chair 500 can be constructed utilizing a plurality of brackets 510 as previously described and a plurality of structural members 505. As previously described, the brackets 510 of the present invention provided improved structural strength for the modular chair 500. Additionally the features of the bracket reduce the difficulty in assembling the modular chair 500. The design of the brackets 510 and the cooperative structural members 505 allow the brackets 510 to be visually exposed, thereby improving the overall appearance of the modular furniture.

The present invention provides an improved modular product that utilizes a bracket that provides increased strength at the interface point between the bracket and the structural member. The design of the bracket also greatly reduces the difficulty level associated with assembly of the modular product while increasing the perceived quality of the modular product.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

The invention claimed is:

1. A bracket for securing a structural member, the bracket comprising:
    a bracket body;
    a first cantilever having a first length extending longitudinally from the bracket body, the first cantilever comprising a flange at a distal end of the first cantilever, the first cantilever further comprising a concave portion extending at least partially between the flange and the bracket body and a fastener receiving void positioned within the concave portion of the first cantilever, the first cantilever being substantially rigid; and
    a second cantilever having a second length that is shorter that the first length of the first cantilever, extending longitudinally from the bracket body and substantially parallel to the first cantilever, the second cantilever having a flange at a distal end, the flange of the second cantilever facing inward toward the first cantilever and aligned within the concave portion of the first cantilever and a fastener receiving aperture within the flange of the second cantilever, the fastener receiving aperture substantially aligned with the fastener receiving void of the first cantilever, the first cantilever separated from the second cantilever to form a first channel for receiving a first structural member, the second cantilever being substantially flexible.

2. The bracket of claim 1, further comprising a third cantilever having a third length extending longitudinally from the bracket body, the third cantilever comprising a flange at a distal end of the third cantilever, the third cantilever further comprising a concave portion extending at least partially between the flange and the bracket body and a fastener receiving void positioned within the concave portion of the third cantilever; and
    a fourth cantilever having a fourth length that is shorter that the third length of the third cantilever, extending longitudinally from the main bracket and substantially parallel to the third cantilever, the fourth cantilever having a flange at a distal end, the flange facing inward toward the third cantilever and positioned aligned within the concave portion of the third cantilever and a fastener receiving aperture within the flange of the fourth cantilever, the fastener receiving aperture substantially aligned with the fastener receiving void of the third cantilever, the third cantilever separated from the fourth cantilever to form a second channel for receiving a second structural member.

3. The bracket of claim 1, wherein the flange of the first cantilever comprises a sloped edge adjacent to the concave portion of the first cantilever.

4. The bracket of claim 1, wherein the second cantilever further comprises a concave portion between the flange of the second cantilever and the main bracket body, the concave portion of the second cantilever being graduated downward from the flange of the second cantilever to the main bracket body, and wherein the flange of the second cantilever comprises a sloped edge adjacent to the concave portion of the second cantilever.

5. The bracket of claim 1, wherein an inside surface of the first cantilever is striated.

6. The bracket of claim 1, wherein an inside surface of the second cantilever is striated.

7. The bracket of claim 1, wherein the bracket is formed of a metal or metal alloy.

8. The bracket of claim 1, wherein the structural member is formed of a wood or wood product.

9. A system for assembling objects comprising at least one bracket of claim 1.

10. Furniture comprising at least one bracket of claim 1.

11. A system for fastening structural members comprising:
    at least one bracket body comprising a first cantilever having a first length extending longitudinally from the bracket body, the first cantilever comprising a flange at a distal end of the first cantilever and a protrusion adjacent a proximal end of the first cantilever, the first cantilever further comprising a concave portion extending at least partially between the flange and the protrusion and a fastener receiving void positioned within the concave portion of the first cantilever; and the at least one bracket body further comprising a second cantilever having a second length that is shorter that the first length of the first cantilever, extending longitudinally from the bracket body and substantially parallel to the first cantilever, wherein a first axis is defined perpendicular to the first cantilever and the second cantilever, the second cantilever having a flange at a distal end and a concave portion extending at least partially between the flange of the second cantilever and the bracket body, the flange of the second cantilever facing inward toward the first cantilever and aligned within the concave portion of the first cantilever and a fastener receiving aperture within the flange of the second cantilever, the protrusion of the first cantilever facing inward toward the second cantilever, the protrusion of the first cantilever and the concave portion of the second cantilever both lying along the first axis, the fastener receiving aperture substantially aligned with the fastener receiving void of the first cantilever, the first cantilever separated from the second cantilever to form a first channel for receiving a first structural member, the first channel defining a generally arcuate passage.

12. Furniture comprising:
at least one bracket body comprising a first cantilever having a first length extending longitudinally from the bracket body, the first cantilever comprising a flange at a distal end of the first cantilever, the first cantilever further comprising a concave portion extending at least partially between the flange and the bracket body and a fastener receiving void positioned within the concave portion of the first cantilever;
the at least one bracket body further comprising a second cantilever having a second length that is shorter that the first length of the first cantilever, extending longitudinally from the bracket body and substantially parallel to the first cantilever, the second cantilever having a flange at a distal end, the flange of the second cantilever facing inward toward the first cantilever and aligned within the concave portion of the first cantilever and a fastener receiving aperture within the flange of the second cantilever, the fastener receiving aperture substantially aligned with the fastener receiving void of the first cantilever, the first cantilever separated from the second cantilever to form a first channel for receiving a first structural member; and
a structural member having a first end sized and shaped to be received in the first channel and including a receiving hole, wherein, upon insertion of the first end into the first channel, the receiving hole of the structural member is substantially aligned with the fastener receiving aperture of the second cantilever and the fastener receiving void of the first cantilever, and a portion of the structural member is disposed on opposing sidewalls of the flange of the first cantilever, wherein upon application of a force at a distal end of the structural member and normal to the structural member, the first flange of the first cantilever at least in part relieves shear stress at the fastener.

13. The furniture of claim 12, wherein the structural member comprises a leg of a chair.

* * * * *